United States Patent [19]

Mallen Herrero et al.

[11] Patent Number: 5,407,744
[45] Date of Patent: Apr. 18, 1995

[54] METHOD FOR PRODUCING STEEL WIRES INTENDED FOR THE MANUFACTURE OF FLEXIBLE CONDUITS, STEEL WIRES OBTAINED BY THIS METHOD, AND FLEXIBLE CONDUITS REINFORCED BY SUCH WIRES

[76] Inventors: José M. Mallen Herrero, 29, boulevard des Batignolles, 75008 Paris; André Sugier, 34, avenue de la Chataigneraie, 92500 Rueil Malmaison, both of France

[21] Appl. No.: 4,276

[22] Filed: Jan. 14, 1993

Related U.S. Application Data

[62] Division of Ser. No. 778,972, Dec. 19, 1991, Pat. No. 5,213,637.

[30] Foreign Application Priority Data

Apr. 20, 1991 [FR] France ............... 90 05063

[51] Int. Cl.⁶ ................ C22C 38/02; C22C 38/04
[52] U.S. Cl. .................... 428/358; 428/606; 428/684; 148/320; 148/321; 148/322; 148/324
[58] Field of Search ........... 148/595, 110, 126, 128, 148/320, 559; 428/364, 358, 684, 683

[56] References Cited

U.S. PATENT DOCUMENTS

| | | | |
|---|---|---|---|
| 2,527,731 | 3/1949 | Ilacqua et al. | 148/546 |
| 3,264,144 | 8/1966 | Frazier et al. | 148/518 |
| 3,591,427 | 7/1971 | Hansen, Jr. | 148/645 |
| 3,668,020 | 6/1972 | Lucht | 148/596 |
| 3,950,190 | 4/1976 | Lake | 148/505 |
| 4,067,754 | 1/1978 | Elias | 148/531 |
| 4,585,062 | 4/1986 | Tiberg | 148/330 |

FOREIGN PATENT DOCUMENTS

| | | |
|---|---|---|
| 0157045 | 10/1985 | European Pat. Off. . |
| 0375784 | 7/1990 | European Pat. Off. . |
| 750290 | 1/1945 | Germany . |
| 2163513 | 2/1986 | United Kingdom . |
| 8910420 | 11/1989 | WIPO . |

OTHER PUBLICATIONS

Patent Abstracts of Japan, vol. 14, No. 47 (C-682), 9 Dec. 1990 & JP-A-1 279 710 (Nippon Steel) 10 Nov. 1989.

*Primary Examiner*—Patrick J. Ryan
*Assistant Examiner*—R. C. Weisberger

[57] ABSTRACT

A method of producing steel wires intended for the manufacture of flexible conduits, steel wires obtained by this method, and flexible conduits reinforced by such wires is characterized by the fact that, for a given strain-hardening rate of the initial wire, a heat treatment is carried out under conditions of time and temperature such that the steel wire obtained after treatment has a mechanical rupture strength (Rm) greater than 850 MPa and a structure containing little free ferrite.

16 Claims, 10 Drawing Sheets

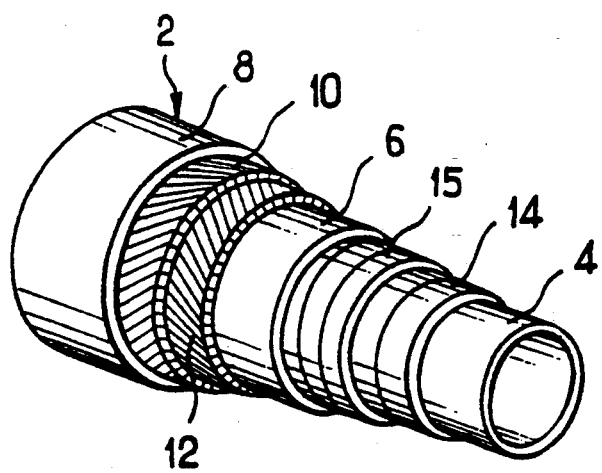
FIG_1
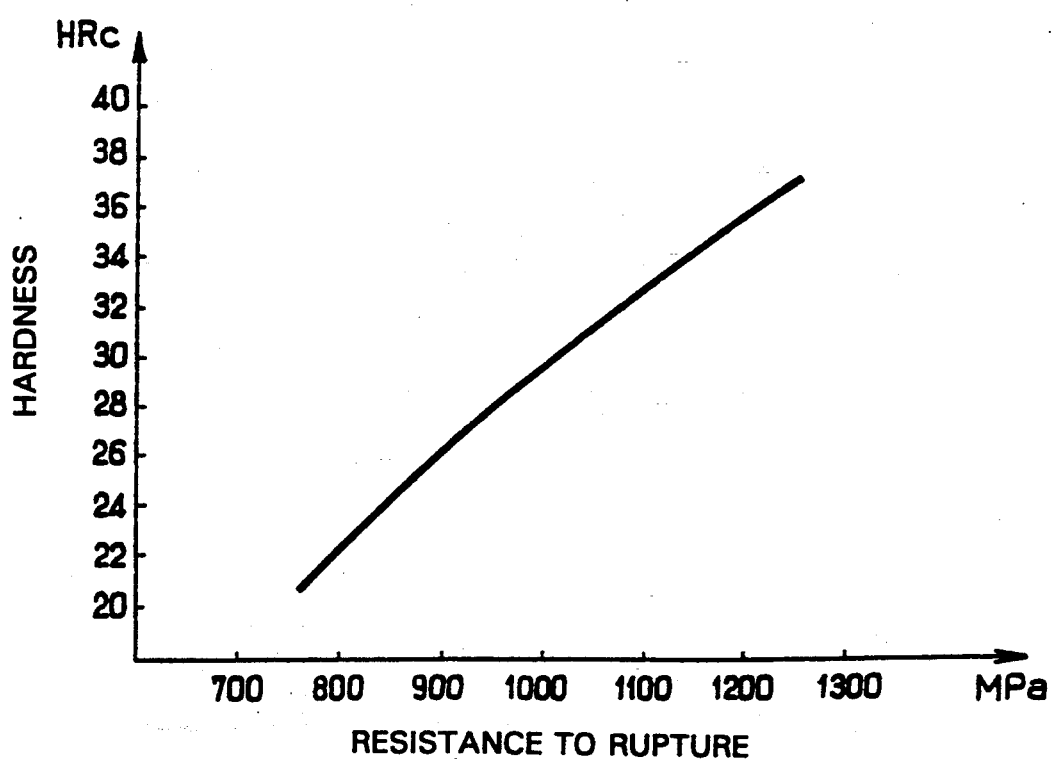
FIG_3

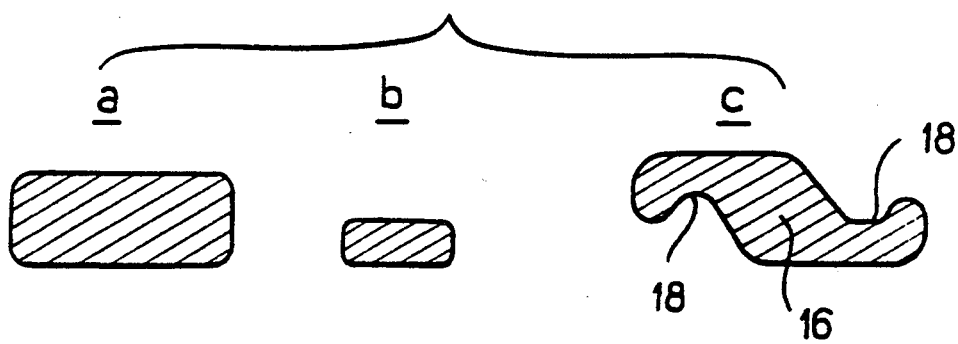
FIG_2
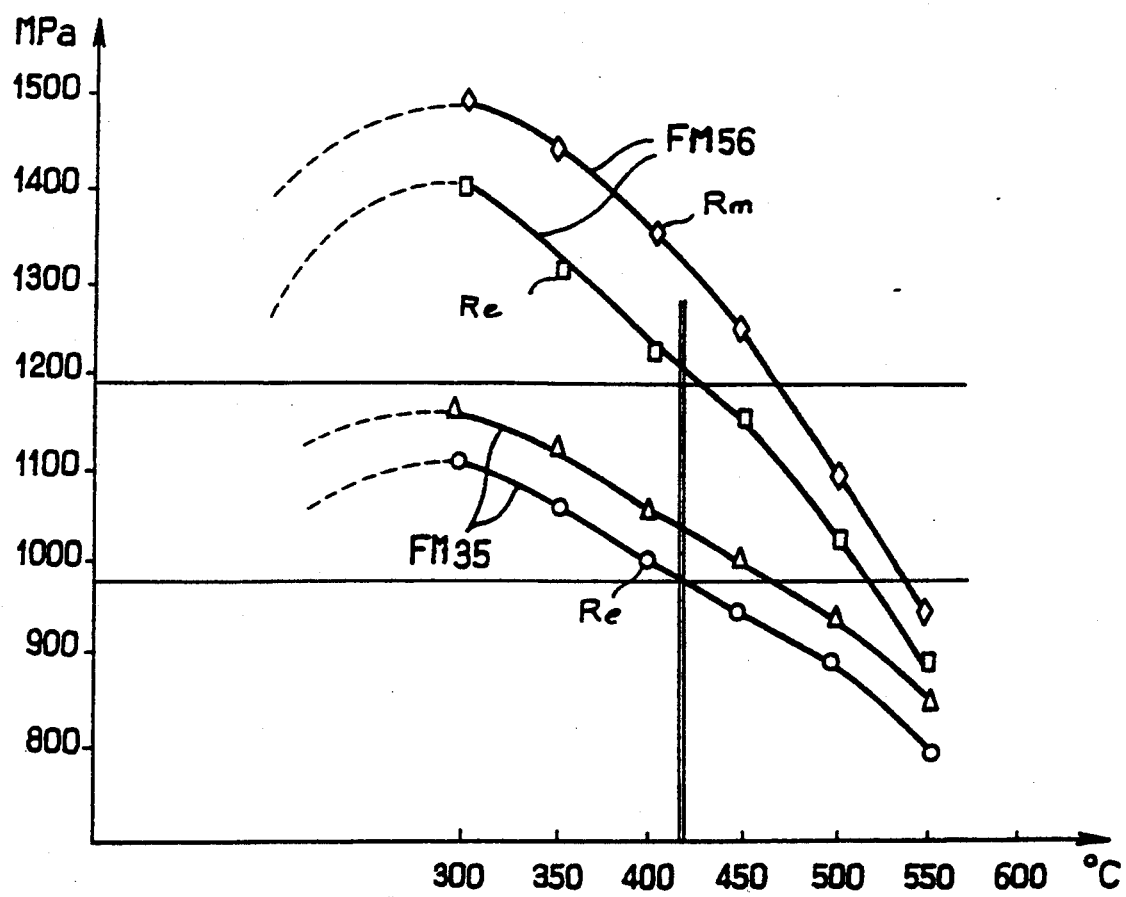
FIG_12

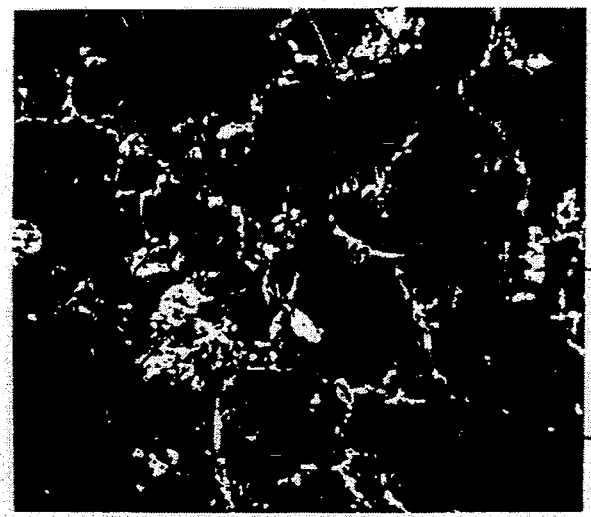
FIG_4b
FIG_4a
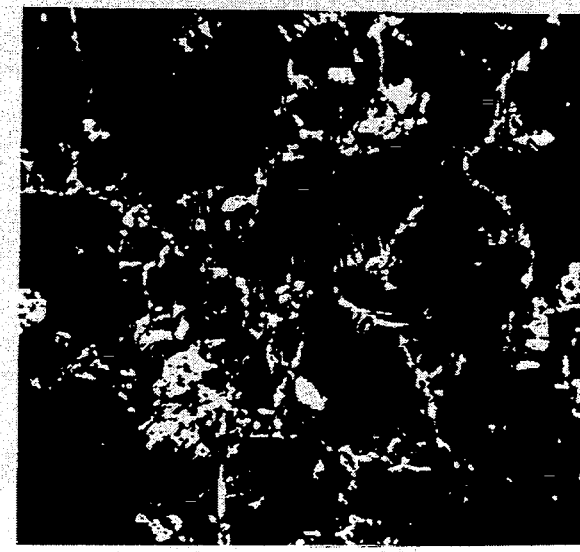
FIG_4c

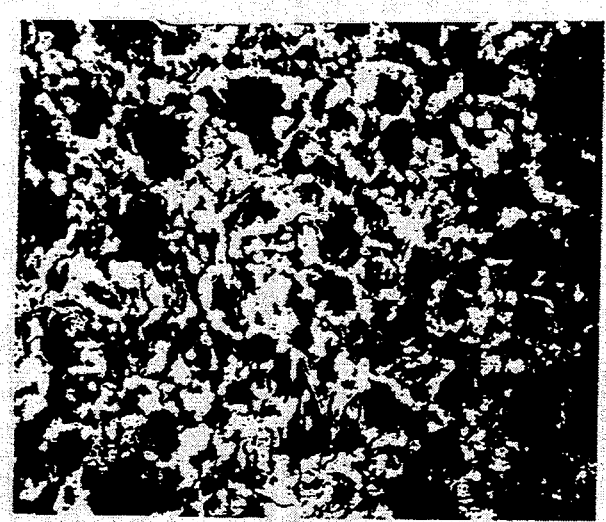
FIG_5b
FIG_5a
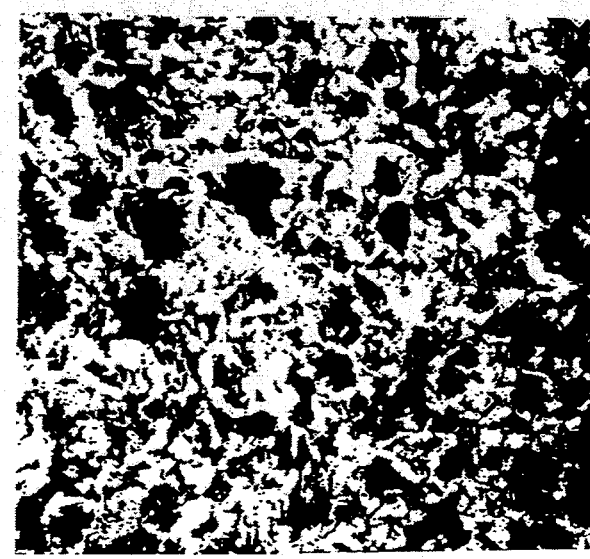
FIG_5c

FIG_6b
FIG_6a
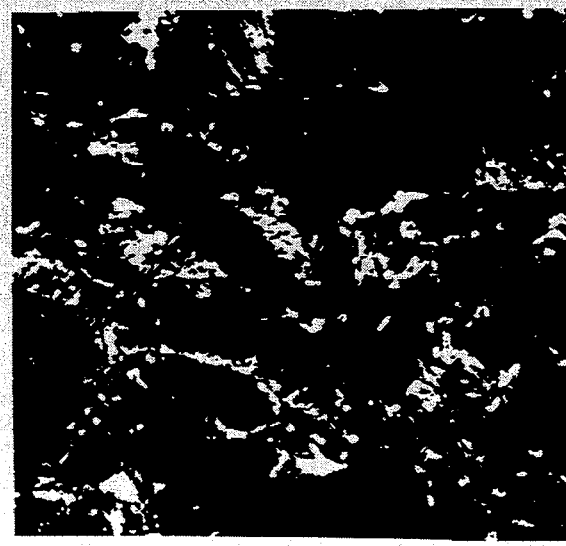
FIG_6c

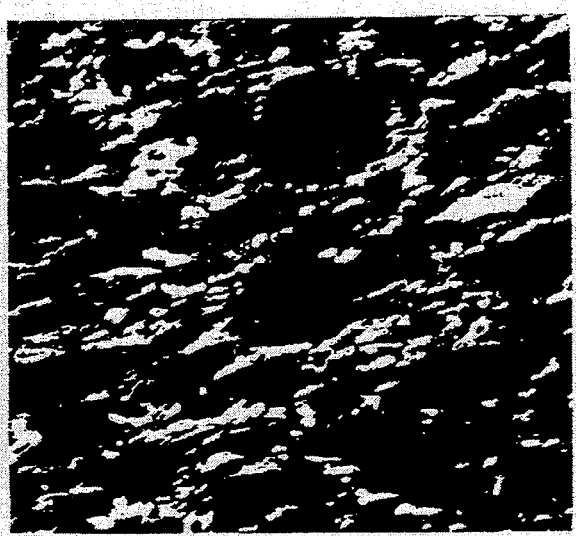
FIG_7b
FIG_7a
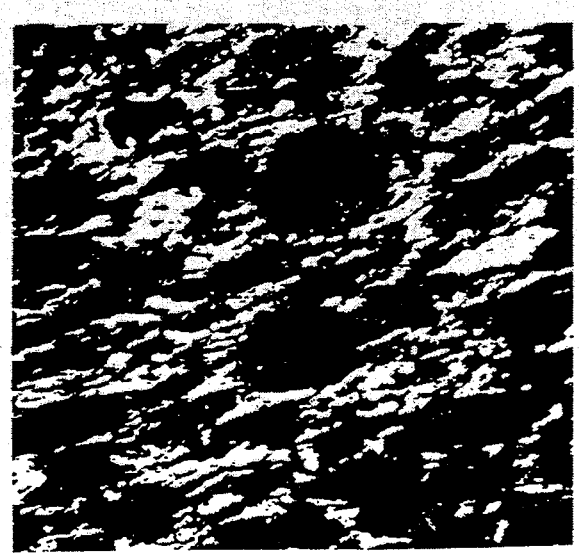
FIG_7c

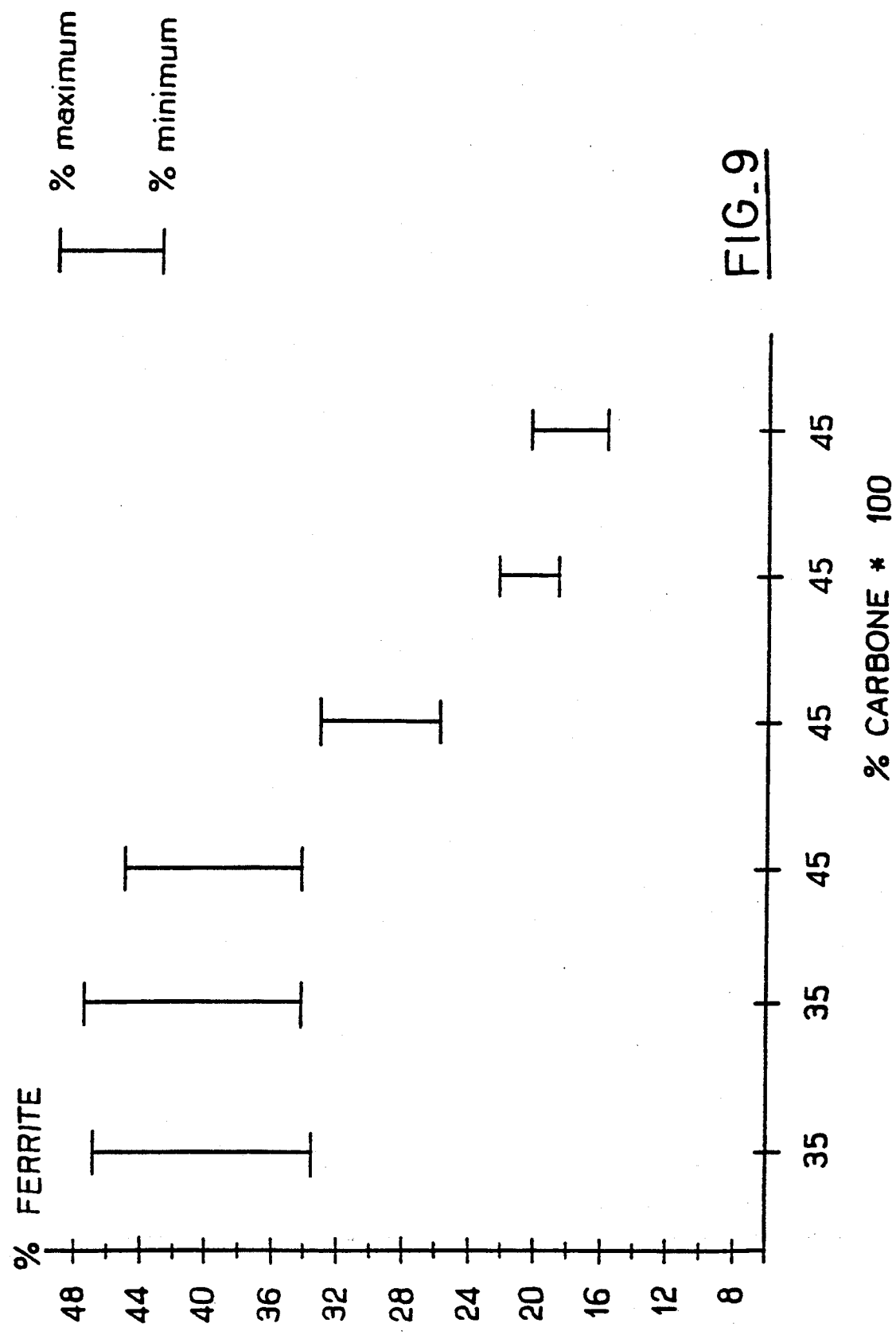
FIG_9

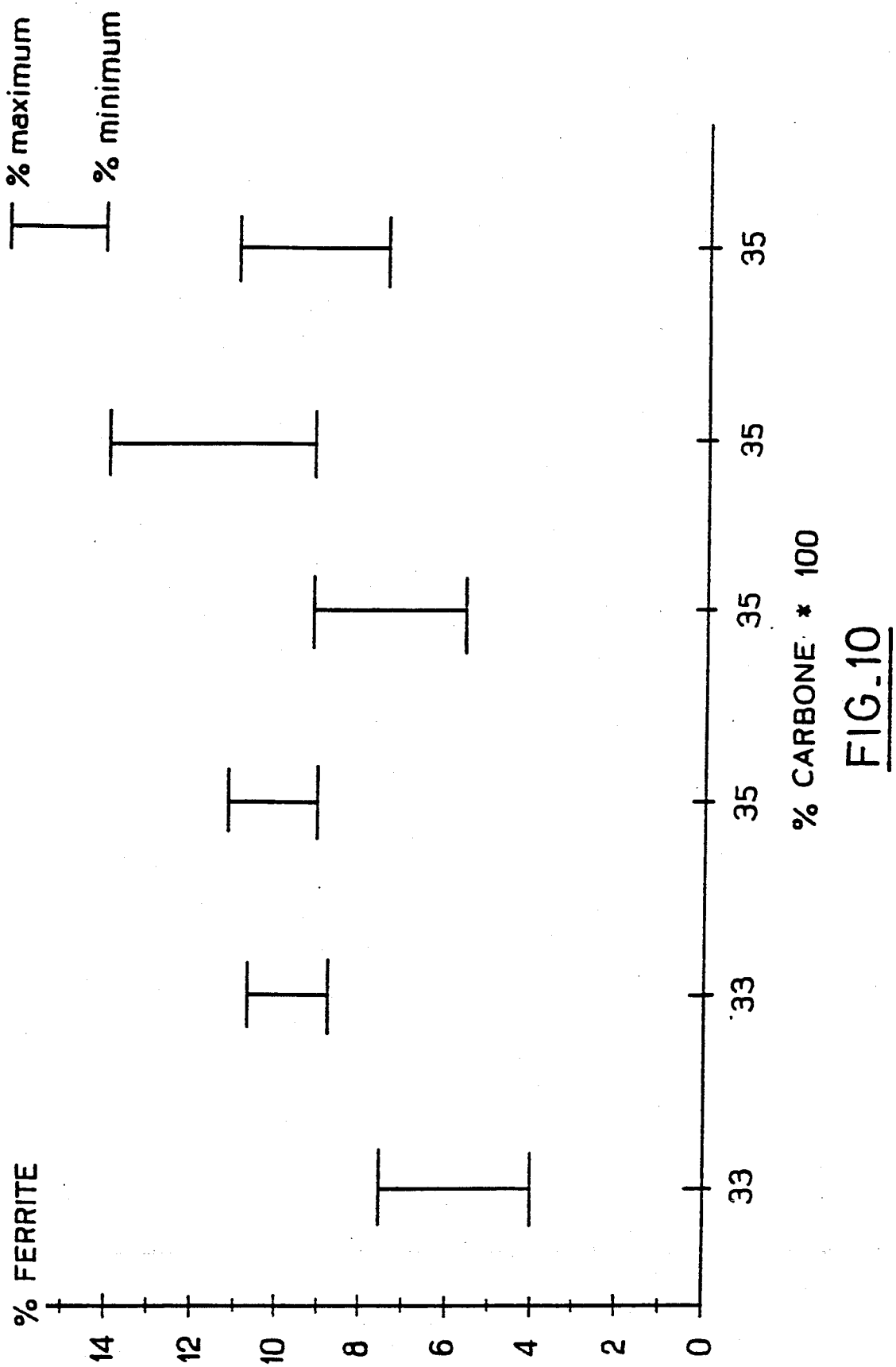

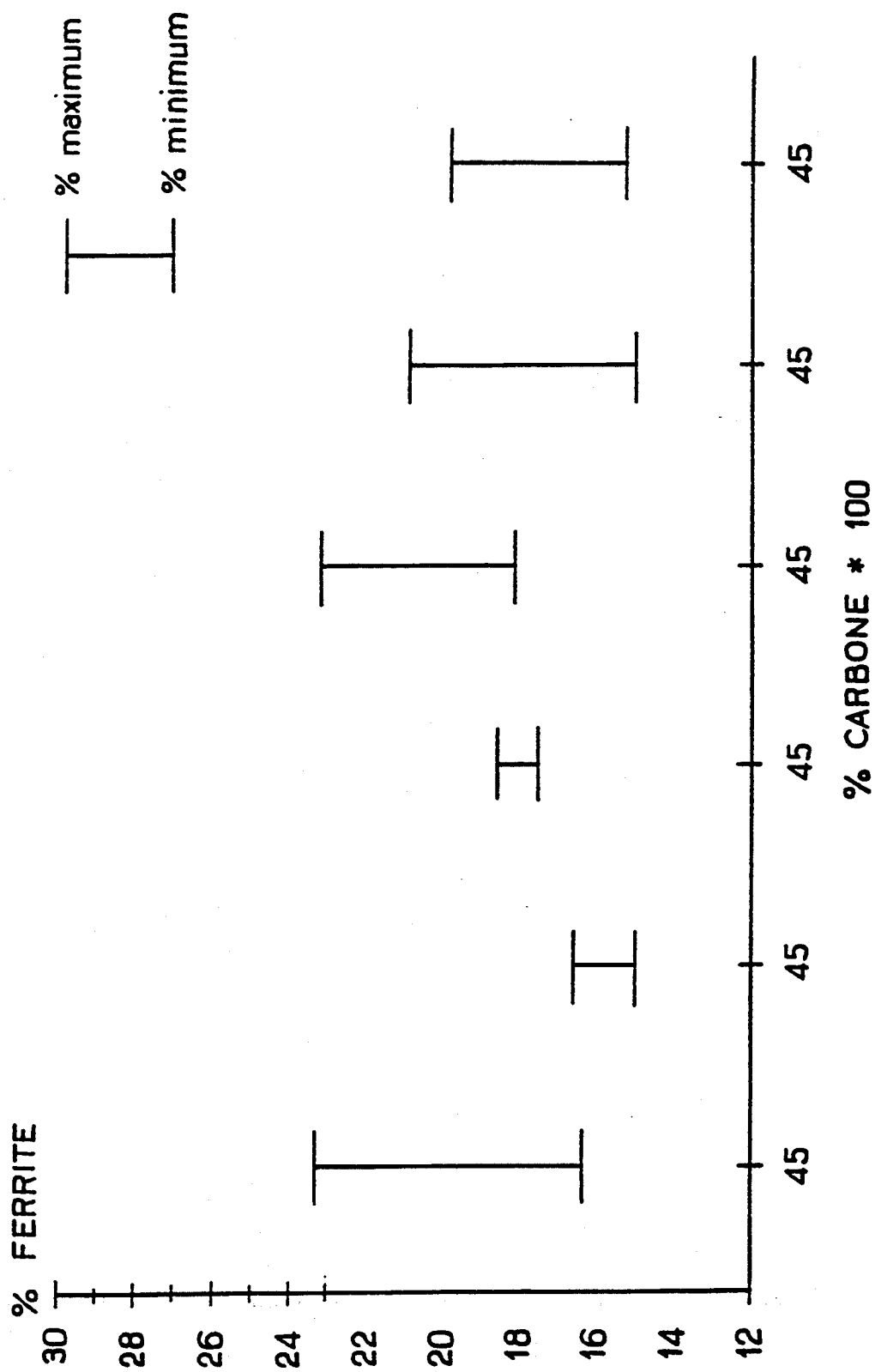
FIG_11

METHOD FOR PRODUCING STEEL WIRES INTENDED FOR THE MANUFACTURE OF FLEXIBLE CONDUITS, STEEL WIRES OBTAINED BY THIS METHOD, AND FLEXIBLE CONDUITS REINFORCED BY SUCH WIRES

This is a division of application Ser. No. 07/778,972, filed Dec. 19, 1991, and now U.S. Pat. No. 5,213,637.

The present invention relates to steel wires for the manufacture of flexible conduits which are resistant to corrosion in the presence of hydrogen sulfide ($H_2S$), and it also relates to the flexible conduits produced by means of these wires. Another object of the invention is the method of manufacturing these steel wires in order to make them resistant in an $H_2S$ atmosphere.

It is known that in numerous applications, flexible conduits with metal reinforcements are used for the transporting of fluids and that in certain cases, particularly in the field of petroleum, these flexible conduits are subject to attack by sulfur-containing products.

In flexible conduits in which tightness is assured by one or more tubes or sheathings of polymeric material, such as thermoplastics or elastomers, the mechanical resistance to internal pressure and to the handling and operating stresses is assured by metal reinforcements made of helically wound steel wires.

These steel wires, which are generally shaped by hot or cold drawing, may have different profiles in the different layers of the metal reinforcements.

These wires may either be substantially flat wires having dimensions of about $2 \times 5$ mm to $4 \times 10$ mm, or wires of a hookable profile, for instance of Z, T or U-shape, permitting the hooking of a wire to the wire of the adjacent turn upon the winding, or else wires of circular cross section possibly assembled in the form of strands (cabled).

In the case of the production of flexible conduits intended to operate in the presence of $H_2S$, the grade of the steels serving for the manufacture of the reinforcement wires, as well as the mechanical and heat treatments carried out on these wires (in particular, strain-hardening upon shaping and then possibly annealing) must be selected in such a manner that these wires provide the necessary mechanical strength in operation, while at the same time they withstand corrosion in the presence of $H_2S$.

For several years, during which problems of the resistance of steel structures in an $H_2S$ atmosphere have arisen, a large amount of research and experimentation has been carried out, both in the laboratory and in practical tests, to determine what characteristics the steels had to have in order to be suitable for use in an $H_2S$ atmosphere.

This research has made it possible to determine that there was a correlation between the resistance to corrosion in the presence of $H_2S$ and the hardness of the metal. More precisely, it was found that carbon steels and low-alloy steels having a hardness less than or equal to 22 HRc had, under stress, satisfactory resistance to $H_2S$ corrosion and were therefore accepted as compatible with $H_2S$.

In the conclusions of this research, it was decided to characterize the metal by its HRc hardness, which permits simple non-destructive measurements. However, as is known, there is an equivalence, given in tables, between the hardness (HRc) and the rupture strength (Rm).

Thus, a hardness of 22 HRc corresponds to a rupture strength Rm of about 775–800 MPa.

In order to take this "$H_2S$ compatibility/hardness" correlation into account, the manufacturers therefore have generally selected soft or semi-hard carbon steels (0.15% to 0.30% C) or low-alloy steels, which they subjected, after the strain-hardening resulting from the shaping (by drawing or rolling) to annealing suitable to bring the hardness to the accepted value, if necessary.

An accepted rule (NACE Standard 0175—National Association of Corrosion Engineers) has furthermore adopted the results of the research referred to above by stipulating that carbon steels, used in the field of petroleum, would be considered compatible with $H_2S$, without further tests, if they had a hardness of less than 22 HRc, the carbon content being stipulated as less than or equal to 0.38%.

This rule therefore leads, in the case of steel wires forming the reinforcements of flexible conduits, to relatively low mechanical properties, corresponding only to at most Rm=775 to 800 MPa, as has been seen above. Furthermore, the elastic limit (Re) is relatively low.

It results from this that the manufacturers of flexible conduits, in order to comply with these requirements, have generally selected a grade of steel of low carbon content (for example 0.15 to 0.30%) and must employ wire cross sections and therefore weights, sizes and prices greater than what would be necessary under less aggressive operating conditions, permitting the use of steels of higher resistance.

In order to remedy these drawbacks, one could propose the use of steel wires of higher carbon content presenting, after strain-hardening and annealing, better mechanical properties such as a hardness of more than 22 HRc (for instance, on the order of 25 to 30 HRc), higher than the hardness admitted by NACE-0175 rule and corresponding to a rupture strength of more than 800 MPa. In this case, these wires which exceed a hardness of 22 HRc had to be protected to withstand corrosion in an $H_2S$ environment, for instance by a surface metal deposit of metal resistant to $H_2S$. Such a method, based on an aluminum coating, is defined in British Patent Application 84 31781 of Dec. 17, 1984 (Publication 2 163 513). However, with such a solution, the gain which could be obtained on the cross section of the wires would be lost, and more than this, by the additional expense resulting from the additional protective metal deposit.

In order to overcome the drawbacks of the steels of low carbon content having excessively low mechanical properties, it is also possible to use other grades of steel, such as stainless austenitic steels or alloys having hardnesses greater than 22 HRc, corresponding to higher rupture limits. However, in this case, once again, the gain which could be obtained on the cross section of wires would be lost due to the higher cost of these metals.

The NACE standard has furthermore provided for the case of such steels not satisfying the basic requirement of a hardness of less than 22 HRc. In this case, these steels must undergo a test on a representative sample, under stress, in $H_2S$ atmosphere (NACE Test Method TM 01-77 relative to the effects of cracking under stress, commonly referred to as "sulfide stress corrosion cracking, or SSCC") in order to be considered suitable for use in the manufacture of metal structures which are to withstand the effects of stress corrosion in the presence of $H_2S$.

Another standard, NACE TM 028487, concerns the effects of cracking induced by hydrogen, commonly referred to as "hydrogen-induced cracking, or HIC". The test procedure which is recommended in said above standard refers particularly to steel tubes and defines samples the cross section of which is usually relatively thick, and it consists in exposing them without tension in a solution of sea water saturated with $H_2S$ at ambient temperature and pressure to a pH of between 4.8 and 5.4.

The object of the present invention is to produce carbon-manganese hypoeutectoid steel wires for the reinforcement of flexible conduits which are compatible with $H_2S$ and which have better mechanical properties than those used up to the present time, and this on basis of carbon steels of ordinary quality, that is to say, without having to have recourse to expensive alloys and/or to provide protection by a metal deposit on the surface.

After lengthy and careful research, the applicants have surprisingly found that steels having a medium or high content of carbon could be used for the manufacture of wires of high mechanical strength while resisting corrosion in the presence of $H_2S$ and satisfying the requirements of the NACE standards, provided that they were subjected to certain operations for conferring suitable properties on them.

During the course of this research, the applicants reached the conclusion that there is a correlation between the $H_2S$ compatibility and a thermal recovery treatment which, in its turn, after strain-hardening, is specific as a function of the strain-hardening rate and the carbon content of the steel used, as will be explained in detail below.

In all cases it is necessary for the steel treated in accordance with the present invention to have a mechanical resistance to rupture ($R_m$) greater than 850 MPa and a structure containing little free ferrite.

In the following description, there is understood by:
free ferrite, the ferrite which is present, on the one hand, at the grain boundaries and, on the other hand, between the perlitic zones within the grains;
perlite, the aggregate formed of alternate lamellas of cementite and ferrite, this ferrite not being considered free within the meaning of the invention;
cementite, iron carbide ($Fe_3C$).

The applicants have found, in fact, that in the case of carbon steels having a hardness of more than 22 HRc, the content of free ferrite has a substantial influence on the $H_2S$ compatibility of these steel wires.

The studies carried out in this direction have shown that the amount of free ferrite must be less than 15% and preferably less than 12%.

When the carbon content is less than 0.55%, an operation known as parenting, which is itself a known heat treatment, is carried out prior out to the strain-hardening step. The parenting is effected, for instance, by continuous passage through a furnace so as to bring the wire to a temperature within the austenitic range and then passing it into an isothermal bath the temperature of which is between 400° and 550° C., for instance a bath of molten lead, and then cooling to room temperature. The patenting makes it possible to homogenize the steel wire and to impart to the steel a structure with homogenization of the distribution and of the morphology of the perlite in the ferrite matrix, suitable for facilitating a cold transformation. The average strain-hardening rate is between 10 and 90%.

The applicants have surprisingly found that for steels of a carbon content of less than 0.55%, the parenting must be carried out at a high temperature, between 950° and 1150° C., and preferably above 1000° C. Such a parenting for this type of steel produces, in addition to a course-grain steel, a structure having a free ferrite content of less than 15%. The size of the grains of the patented wire should preferably be less than an index 7, and preferably less than 6, of AFNOR Standard NF 1-04102.

In the case of steels of a carbon content of more than 0.55%, one may or may not proceed with a patenting in accordance with the invention. In the event that one should opt for parenting in order to obtain a homogeneous wire which is easier to transform cold, it is then preferable for the continuous heat treatment to be carried out at a temperature above the austenitization temperature $AC_3$ of the steel used; the average strain-hardening rate is between 5 and 80%.

The parenting temperature in accordance with the invention is the temperature reached by the wire in the furnace.

In the event of cold strain-hardening, whether or not preceded by a parenting depending on the carbon content of the steel used, the wire obtained is subjected to a heat treatment, known as recovery, the temperature and duration of which are such that the elastic limit of the wire after the recovery treatment is less than that which it had in strain-hardened state. It was discovered that the steel has a good $H_2S$ compatibility.

In the event of shaping at a given temperature, for instance between 450° and 700° C. and in all cases less than the $AC_1$ temperature, said shaping possibly inducing a strain-hardening effect by a judicious adjustment of the strain-hardening rate, of the temperature and of the C content of the steel used, one obtains, in final state, a wire the elastic limit of which is less than that of the same cold-worked wire with the same strain-hardening rate. The applicant has found that when the ferrite content is less than 15%, the wire thus obtained is compatible with $H_2S$.

The wires produced in accordance with the new method successfully pass NACE Test 01-77, which has been mentioned above. The wires thus produced can have rupture strengths of between 850 and 1200 MPa, namely up to more than 50% greater than those of the carbon-steel wires which have been used up to now.

Furthermore, the wires in accordance with the invention satisfy NACE Standard TM-0284-87 (HIC).

It is thus possible either to reduce the cross section of the wires substantially in the same proportion or to increase—substantially in the same proportion—the operating pressure of the conduits (for the same cross section of the reinforcement wires).

In accordance with the invention, one can now use a steel having a carbon content of more than 0.38% and/or the hardness of which is more than 22 HRc.

The recovery treatment is a process, already proposed for other applications with specific grades of steel, which can be carried out either batchwise, in lots or coils (so-called "batch treatment"), or continuously by passage through a thermal or induction furnace.

Good results have been obtained in the case of "batch treatment" with variable times, in particular on the order of 3 to 6 hours after having been brought to temperature and at a temperature between 400° and 600° C. Obviously, in accordance with the invention, the time of treatment can be varied as a function of the temperature and conversely, so as to obtain given mechanical properties, the time of treatment being possibly between several hours and several dozen hours. This depends essentially on the transformation of the structure of the steel, as it may appear upon microscopic examination with strong magnification. In any event, the perlite-ferrite structure of the steel is maintained up to the end of the treatment, and the globulization which could appear remains at a very low level, which makes it possible to obtain high mechanical properties.

In the case of heat treatment by passage through a furnace, the values of the intensity of the heating, the speed of passage and the length of the furnace are selected in such a manner that, on the one hand, the resistance to rupture strength is reduced by at least 5% and preferably more than 10% and, on the other hand, the temperature of the wire in the furnace is less than the temperature corresponding to the start of the austenitization temperature ($AC_1$ point).

A prior document (U.S. Pat. No. 3,950,190 to Lake) describes a heat treatment for cold-worked carbon steels referred to by the expression "recovery annealing" which consists in limiting the temperature and the time of the treatment so as to obtain a product having a rupture strength of between 379 and 551 MPa and having increased ductility. In this method, the temperature and the time of the treatment are so selected that the steel retains, after the heat treatment, 80 to 95% of its rupture strength after cold-working and shows substantially no recrystallization. There is therefore also concerned there only a small recovery of the metal, but this patent concerns a field and a quality of steel which are entirely different from those of the present invention. In fact, the steels to which this recovery annealing treatment is applied are extra-soft or soft steels (0.02 to 0.15% C) with strengths after treatment (379–551 MPa) which are far less than those (770 to 800 MPa corresponding to HRc=22) that one can already obtain in conventional manner for steel wires compatible with $H_2S$ and those (850 to 1200 MPa) which can now be obtained in accordance with the present invention.

Finally, the purpose pursued in said prior patent is to improve the ductility of thin-drawn sheets, in particular for the automobile industry, without in any way contemplating an improvement in the resistance to corrosion.

Other prior patents (U.S. Pat. Nos. 3,264,144, 3,591,427, 4,067,754) also provide, after strain-hardening, limited recovery heat treatments under temperatures and/or for periods of time sufficiently low in order substantially to avoid or limit recrystallization. However, as in the case of the aforementioned U.S. Pat. No. 3,950,190, these treatments apply only to steels having a carbon content of less than 0.15%, particularly thin sheets, in order to improve their ductility.

U.S. Pat. No. 4,585,062 describes a recovery treatment for rigid rods of relatively short length made with steels of low carbon content and high manganese and silicon contents.

In patents EP 0 375 784-$A_1$ and JP 1-279 710, it is proposed to use carbon steels having a content of between 0.4 and 0.8, the machine wire, of perlite-ferrite structure, being cold-worked and then heat treated so as to obtain a treated steel wire of a mechanical resistance to rupture (Rm) not exceeding 80 kg/mm$^2$ or 800 MPa and the structure of which is spheroidal or globulized, in which the perlite has disappeared and in which only cementite in globulized state remains.

Due to the spheroidal or globulized structure, the steel wires obtained by the methods described in said patents can only have limited mechanical strengths. Furthermore, in accordance with these patents, the wires must not have a hardness of more than 22 HRc, as otherwise they would not be compatible with $H_2S$ since cracks would appear due to the stress corrosion (SSCC).

The invention will be better understood from the following description and the accompanying drawings.

In the drawings:

FIG. 1 is a perspective view, partially broken away, of a flexible conduit in accordance with the invention;

FIG. 2 show, in cross section, three profiles of steel wires used as reinforcement in the flexible conduits;

FIG. 3 is a graph of approximate correspondence between the Rockwell hardness (HRc) and the rupture strength (Rm) for the steel;

FIGS. 4a to 4c are photographs relative to a patented round machine wire in accordance with the present invention;

FIGS. 5a to 5c are photographs relative to the round machine wire of FIGS. 4 which have undergone insufficient parenting;

FIGS. 6a to 6c are photographs relative to the round machine wire of FIGS. 4, which has been properly patented, shown after shaping;

FIGS. 7a to 7c are photographs relative to another round machine wire which has been insufficiently patented, shown after shaping;

FIG. 9 shows the free ferrite content of various poorly patented samples of machine wire;

FIGS. 10 and 11 show the free ferrite contents of various steel wires, after shaping;

FIG. 12 shows curves representative of the influence of a recovery treatment on the mechanical properties.

Figure 8:
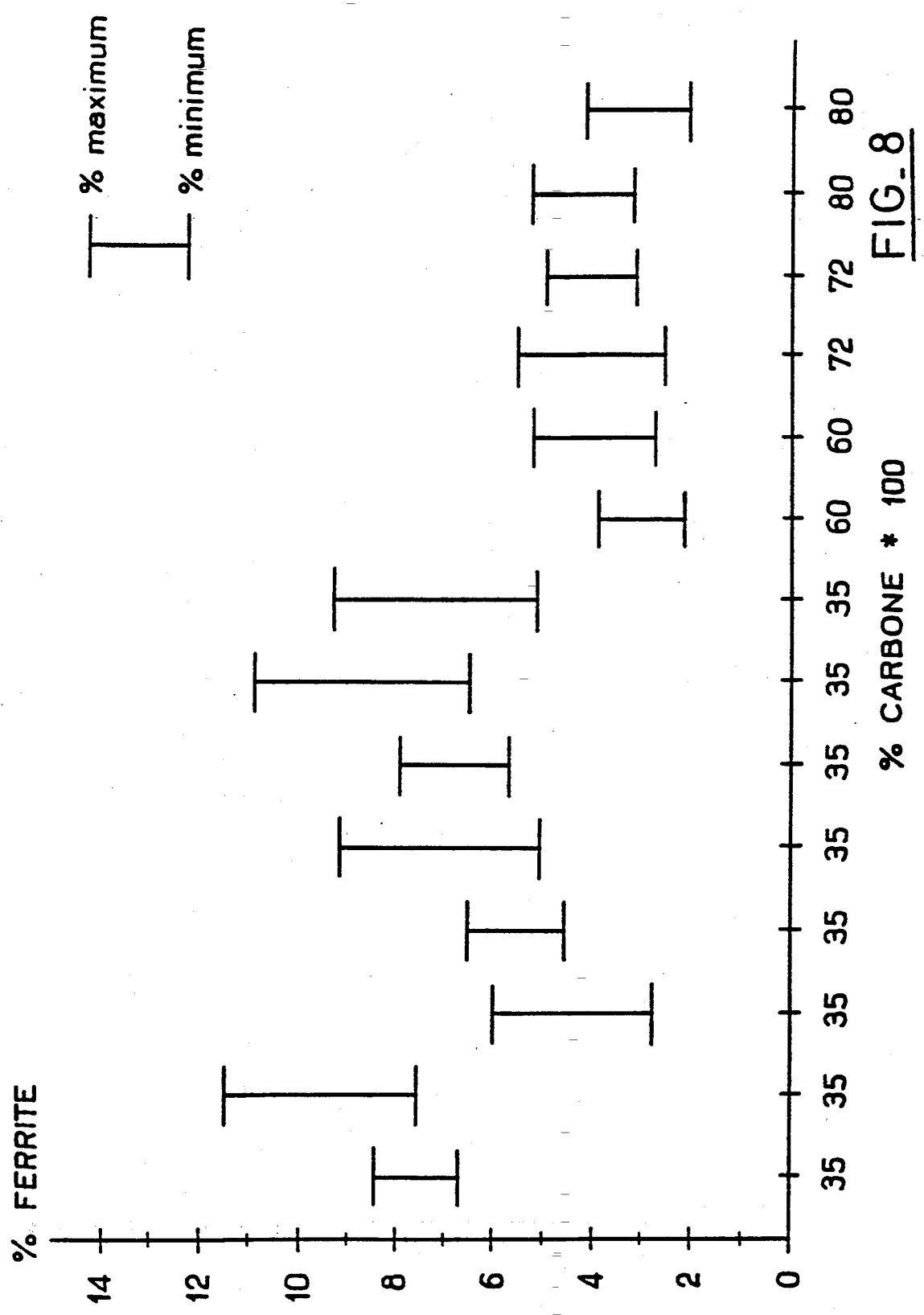
FIG. 8 shows the free ferrite content of various samples of machine wire.

FIG. 1 shows an example of a flexible conduit 2 which comprises three tubes or sheathings (inner 4, intermediate 6, outer 8) of thermoplastic material, in particular of polyamide 11, marketed under the name of RILSAN, the inner sheathing 4 assuring the tightness function. The mechanical strength is assured by reinforcements of helically wound steel wires which may have different profiles, as shown in FIG. 2.

The reinforcements 10, 12 and 15 may be made of flat wire of rectangular profile with rounded corners, such as shown in FIG. 2a (hooping wire 15) or FIG. 2b (reinforcement wire 10, 12). These wires may have cross sections on the order of 10×4 mm (hooping wire) and 5×2 mm (reinforcement wire), of circular cross section or of any other suitable shape, the dimensions of the section of which may vary from 1 to 40 mm.

Another metal reinforcement 14 may consist of shaped wire having a profile permitting hooking upon winding around the tube or sheath 4. A known profiled shape of this wire, of the Z-shape wire type, is shown in FIG. 2c.

The hooping and reinforcement wires, due to their simple profile (FIGS. 2a, 2b), undergo uniform deformation by strain-hardening upon the shaping operations. However, it is to be noted that the Z-shaped wires (FIG. 2c), upon the shaping operations, experience different strain-hardening rates in the different regions of the section as compared with the average strain-hardening rate of the entire section. Thus, the central region 16 undergoes slight deformation (for example, strain-hardening rate on the order of 35 to 45%), while the side regions 18 may undergo greater deformation (for instance, strain-hardening rate on the order of 60 to 80%).

According to the present invention, the initial carbon-steel wire has a carbon content of between 0.25 and 0.8%, and the average strain-hardening rate is between 5 and 80%. By initial wire, there is understood preferably a hot-rolled wire such as a so-called machine wire of circular cross section or a wire of merchant-bar type of any profile.

In the case of steels having a carbon content of less than about 0.55%, parenting is effected. The patenting operation is carried out, for instance, by passing a machine wire into a furnace which is so adjusted that the temperature of the wire is brought to a value greater than or equal to 1000° C., and preferably on the order of 1050° C. to 1100° C.

Upon emergence from the furnace, the wire passes into an isothermal bath, for instance of molten lead, the temperature of which is between 450° and 550° C. The operation is continued by cooling to room temperature. The patented machine wire in accordance with the invention has a course-grain structure and a small amount of free ferrite.

The influence of the parenting on the content of free ferrite is shown in FIGS. 4 to 7 in the case of machine wires and shaped wires having a carbon content of between 0.35% and 0.45%. The free ferrite content was determined by photographic treatment based on examination under optical microscope.

The sample wires are coated and then, after polishing, attacked to disclose the structure as in the case of an ordinary metallographic examination. A negative is then taken with an enlargement of 200 to 1000 by means of an optical microscope of the MICROTEK MFS type. The optical image obtained is then placed in binary form.

One can thus determine the content of free ferrite, expressed in percentage of surface and therefore in volumetric rate in the steel. A number of optical sample analyses were carried out in this manner for various products so as to determine, for each product studied, an average content of free ferrite.

In order to avoid the danger of error with respect to the amount of ferrite, determinations of the ferrite surface were made on two binary images covering by excess and deficiency the grey contents noted on the photographic negative.

FIG. 4a shows the photographic negative of a machine wire of round FM35 type. In the case of the sample analyzed (C content of 0.35%), the machine wire was subjected to parenting at an elevated temperature of more than 1000° C. The free ferrite appeared light in the negative and is represented by the reference F, while the rest of the structure of the steel used appeared dark and is referenced by G. The enlargement is 200×.

FIGS. 4b and 4c are the slightly enlarged binary images of the photographic negative of FIG. 4a, the treatment of the photograph having been effected by means of suitable software, such as that marketed under the name "VISILOG".

The free ferrite (F) appearing light in FIGS. 4b and 4c has a concentration deficiency of 6.7% in the case of FIG. 4b and a concentration excess of 8.5% in the case of FIG. 4c.

When the same sample wire is not patented or is insufficiently patented, this leads to pictures such as those shown in FIGS. 5a to 5c. FIG. 5a is the photographic negative (enlargement 500×), while FIGS. 5b and 5c are the binary images obtained from the negative of FIG. 5a. It is noted that the amount of free ferrite (F) is 33.5% by deficiency and 47% by excess. In the case of the FM 35 sample, the machine wire was patented at a temperature of less than 950° C.

It is thus shown that the parenting operation, when it is carried out correctly, has a considerable influence on the free ferrite content of the steel and is, as a result, compatible with $H_2S$ after strain-hardening and thermal recovery treatment, as will be seen further below.

A cold work strain-hardening operation is then carried out on the sample wires, followed by a heat treatment. In the various cases studied, it was possible to determine that the free ferrite contents characterizing the wire formed in its final state were not significantly affected. This is shown in FIG. 6.

FIG. 6 relate to the sample wire patented in accordance with the invention of FIGS. 4. The binary images (FIGS. 6b and 6c) of the photographic negative of FIG. 6a (enlargement 500×) show that the free ferrite content is between 6 (FIG. 6b) and 9.3% (FIG. 6c), with a strain-hardening rate of 60%, and a recovery temperature of 450° C.

FIGS. 7 relate to an FM 45 steel wire (carbon content 0.45%) which is insufficiently patented (temperature below 950° C.), strain-hardened to 60%. FIGS. 7b and 7c, placed in binary form from the photographic negative of FIG. 7a (1000× enlargement), show that the free ferrite content is between 16.3 and 23.4. Comparison with a wire of the same percentage of carbon which has been correctly patented would show that the free ferrite content would be less than 15%, as in the case of the examples relating to the FM 35 shown in FIGS. 4 and 6.

The present invention shows that for steels of a carbon content of between 0.25% and 0.55%, the specific parenting recommended makes it possible to obtain a steel wire having a low content of free ferrite and that this low content is found again after strain-hardening and heat treatment of the formed wire, said wire then having good compatibility with $H_2S$, as will be seen further below.

In the case of these steel wires (0.25<C<0.55%), patented at high temperature, preferably above 1000° C., the average strain-hardening rate of the entire section cold must be between 20 and 80%.

The influence of the parenting on the content of free ferrite is shown in the following example.

The machine wire treated in accordance with the invention has the following composition:

C=0.36%
Mn=0.68%
Si=0.21%
Al=0.030%
Ni=0.038%
Cr=0.034%
Cr=0.047%
Mb=0.004%
S=0.013%
P=0.013%

By the method of determination indicated with regard to FIGS. 4 to 7, the corresponding free ferrite contents were determined on six samples of machine wire before parenting (Stelmor wire) and after parenting at a temperature above 1000° C.

Without patenting, the free ferrite contents are between 35.9% (minimum values) and 46.8% (maximum values), while after parenting the free ferrite contents found are between 1.89% (minimum values) and 4.61% (maximum values).

In the case of steels of a high carbon content of more than 0.5%, it is possible not to effect the patenting or to effect it at a temperature which is greater than the austenitization temperature ($AC_3$ point) corresponding to the steel used.

For these steel wires (C>0.5%), the strain-hardening rate is greater than 5%.

FIGS. 8 to 11 show various values of the free ferrite content which were determined under the conditions described above on samples of machine wire and shaped wire taken from manufacturing batches made with steels of a carbon content varying from 0.35% to 0.80%. It was thus possible to study the correlation between the values of the free ferrite content and the results described below of the $H_2S$ compatibility tests of the corresponding wires.

FIG. 8 shows the values of free ferrite content determined for various samples of round machine wire having carbon contents varying from 0.35% to 0.80%.

The average content of the properly patented FM 35 sample wire is 9% and all the values are less than 12%. It will be noted that when the carbon content is greater than 0.5%, the free ferrite content is low, even though there was no parenting operation.

The samples on the left of FIG. 8 (C content of 0.35%) were patented at high temperature (above 1000° C.), while the samples on the right side of the figure (C content between 0.60 and 0.80%) were not patented (Stelmor wire).

FIG. 9 concerns various samples of round machine wire the carbon contents of which vary from 0.35 to 0.45% and which underwent parenting at an insufficiently high temperature (less than 950° C.).

For carbon contents of less than 0.5%, the average free ferrite content is about 31%, no sample having a content less than the limit of 15%.

FIGS. 10 and 11 relating to carbon contents of 0.33 to 0.45% make it possible to note that, even after shaping and recovery heat treatment, the difference in free ferrite content between the properly patented sample wires (FIG. 10) and those improperly patented (FIG. 11) is relatively large since in the case of FIG. 10 the average content of free ferrite is 7.2% and in all cases less than 14%, while in the case of FIG. 11, the average free ferrite content is 18.5% and in all cases greater than 15%. The average strain-hardening rate of the cross section and the recovery temperature for these wires are 60% and 450° C., respectively.

The steels used for the carrying out of the invention are advantageously steels which are currently used in wire drawing, preferably having an Mn content of 0.6 to 1.4% and, for instance, an Si content on the order of 0.2% to 0.4%. These steels are without alloy element and, in one advantageous embodiment, contain no additive of the dispersoid type (Ti, V, B, Nb, etc.).

After strain-hardening by drawing, rolling, hammering, or any other manner of cold transformation in order to obtain profiles such as those shown in FIG. 2, the mechanical strength properties are:

elastic limit Re=750 to 1150 MPa
rupture limit Rm=850 to 1200 MPa
HRc hardness=24 to 38

An approximate equivalence curve between hardness (HRc) and rupture strength is shown in FIG. 3.

Starting from the cold deformed stage, it is known to improve the mechanical properties by heat treatments.

Thus, by a conventional heat treatment around 570° C. to 600° C. for periods of four hours, the mechanical properties of a steel containing 0.36% carbon which had been strain hardened to the extent of 60% are brought to:

Re 660-690 MPa
Rm 770-800 MPa
HRc<22

The steel then satisfies the conditions specified in NACE rule 0175 for use in the presence of $H_2S$, that is to say HRc<22.

From the foregoing, it is seen that, after such a heat treatment, the hardness as well as the rupture strength have been brought to about 66 to 70% of their values after strain-hardening which corresponds to an advanced recovery accompanied by a relatively large amount of recrystallization.

In accordance with the present invention, it was sought to determine the influence on the content in an $H_2S$ environment of a recovery treatment carried out at lower temperatures in order to have only a partial recovery of the metal, with little or no recrystallization. In the case of batch treatment, it was found that the temperature of the heat treatment must be between 400° and 600° C.

Table 1 below, given by way of example, shows the development of the mechanical properties for a steel having the analysis

| C | Mn | Si |
|---|---|---|
| ≃0.36 | ≃0.6 | ≃0.2 | after patenting of the machine wire at a sufficiently high temperature (above 1000° C.) and strain-hardening of 60%, as a function of the temperature of the final heat treatment, for temperatures between 400° and 570° C. The free ferrite content is less than 12%.

It should be noted that in this table, test No. 6 was included by way of memorandum, as comparison, and that it corresponds to the conventional treatment mentioned above, which reduces the hardness to 22 HRc, as required by the NACE rule.

TABLE 1

| Test | Condition Strain-hardened | ReMPa 1 019 | RmMPa 1 094 | HRc 32 to 34 |
|---|---|---|---|---|
| 1 | 4 hr at 400° C. | 945 | 1 050 | 31 to 32 |
| 2 | 4 hr at 430° C. | 940 | 1 050 | 31 to 32 |
| 3 | 4 hr at 450° C. | 932 | 1 013 | 30 to 31 |
| 4 | 4 hr at 500° C. | 845 | 928 | 27 to 29 |
| 5 | 4 hr at 550° C. | 700 | 870 | 25 to 27 |
| 6 | 4 hr at 570° C. | 690 | 775 | <22/ NACE standard |

From this table, it is seen that in the case of Tests 1 to 5, the hardness after recovery was reduced between 80% and 95% approximately of the hardness after strain-hardening, that is to say with little or no recrystallization.

Samples of shaped wire subjected to a heat recovery treatment illustrated in FIGS. 10 and 11 were subjected to the SSCC test NACE 01.77 with test specimens of dimensions of 155 mm in length, 9 mm in width and a thickness of 4 mm. It was thus found that all the wires of FIG. 10 (with carbon contents of 0.33 to 0.35%, patented at a temperature above 1000°) which had a free ferrite content of less than 15% successfully passed the test with stresses which reached 500 MPa, while all the FM 45 samples of FIG. 11 having a free ferrite content of more than 15% broke at 400 MPa.

In order further to illustrate the correlation which has been discovered between the free ferrite content and the H₂S compatibility of a steel wire which was subjected after strain-hardening to a heat recovery treatment in accordance with the invention, Table II below summarizes the results of the SSCC test NACE 01.77 carried out on a series of samples of wires which had been subjected, before strain-hardening and recovery treatment, to a prior parenting treatment of the machine wire carried out at various temperatures so as to obtain different values of the free ferrite content, varying from 8 to 22%.

TABLE 11

FM 35 STEEL PATENTED - STRAIN-HARDENED - RECOVERED
Mechanical Properties are Rm 1000 Re 850

| Patenting | Ferrite Content | Stress NACE Tests | Rupture Time or NR at the end of 30 days |
|---|---|---|---|
| Patented at a temperature >1000° C. | 8% | 400 MPa | NR |
| | | 500 MPa | NR |
| | | 600 MPa | NR |
| Patented at a temperature >1000° C. | 12% | 400 MPa | NR |
| | | 500 MPa | NR |
| | | 600 MPa | NR |
| Patented at a temperature of 950° C. | 17% | 400 MPa | NR |
| | | 500 MPa | 23 days |
| | | 600 MPa | 6 days |
| Patented at a temperature of 900° C. | 22% | 400 MPa | 19 days |
| | | 500 MPa | 7 days |

It is noted that in the case of the FM 35 sample analyzed, it satisfied the NACE 01-77 tests in H₂S environment upon being subjected to stresses which vary between 45 and 70% of the elastic limit.

The steel wires with a carbon content of between 0.55 and 0.8, which steels contain little free ferrite and were obtained from mchine wires produced by a process of the STELMOR type and not subjected to a patenting before strain-hardening, successfully passed the SSCC test of NACE Standard 01-77.

Furthermore, other tests carried out in accordance with NACE Standard TM 02 84 87 made it possible to find that the steel wires obtained in accordance with the present invention have good resistance to hydrogen embrittlement (HIC). The test procedure consisted in exposure without tension in a solution of H₂S saturated sea water at ambient temperature and pressure at a pH between 4.8 and 5.4, and after 98 hours of testing, in evaluating the samples after having cut the samples in four and examined the cut faces in order to determine the possible presence of cracks.

The following results concern an FM 35 steel wire, and the specimens being of a length of 100 mm, a width of 15.3 mm and a thickness of 4 mm.

In the table of the results, there is reported the CSR value, i.e. the "Crack Sensitivity Ratio" as defined in the Standard:

FM 35 steel conditioned patented - strain-hardened - recovered
Mechanical properties Rm = 1000 MPa Re = 850 MPa
Test in accordance with NACE Standard TM 02 84

| Patenting | Ferrite Content | CSR |
|---|---|---|
| Patented at a temperature > 1000° C. | 8 | 0 |
| Patented at a temperature > 1000° C. | 12 | 0 |
| Patented at a temperature of 950° C. | 17 | 2 |
| Patented at a temperature of 900° C. | 22 | 5 |

The steels in accordance with the invention show no trace of fissuring after the test (CSR=3). On certain test specimens which were not cut, the mechanical properties after the test were determined in accordance with TM Standard 02 84.

On the test pieces of low ferrite content of 8 and 12%, no variation in the rupture strength (Rm), elastic limit (Re) or elongation (A%) was noted, which confirms that the steel was not sensitized by the hydrogen.

These results, taken together, show that, due to the recovery treatment in accordance with the invention, in the case of a carbon steel with contents of between 0.25 and 0.80%, without additive of dispersoid type (Ti, V, B, Nb, etc.), this suitably treated steel after cold working is characterized by the fact that, while having high mechanical properties Rm above 800 MPa, it successfully passes NACE Test 0177 which serves to determine the compatibility of use in the presence of H₂S under stresses on the order of 45% and possibly up to 7% of the elastic limit, as well as NACE Test TM 02 84 87, provided that the content of free ferrite is sufficiently low, namely less than 15%, and preferably less than 12%.

FIG. 12 shows representative curves of two samples of FM 35 and FM 56 steel wires on which the rupture (Rm) and elastic (Re) limits are plotted on the ordinates and the thermal treatment temperature on the abscissas.

In the case of the FM 35 wire, after patenting at a temperature above 1000° C. and strain-hardening of 60%, the values of Re and Rm, before any heat treatment, are 975 and 1105 MPa, respectively.

In the case of the FM 56 wire, after patenting at a temperature above 950° C. and 60% strain-hardening, the values of Re and Rm, before heat treatment, are 1180 and 1370 MPa, respectively.

For memorandum, it is pointed out that NACE Standard 01.75 considers as compatible with H₂S carbon steels having an HRc less than or equal to 22, which corresponds to a maximum Rm of about 780 to 800 MPa.

It may be noted from the curves of FIG. 12 that, for relatively low thermal treatment temperatures on the order of 300° to 400° C. in the case of the particular steel concerned here, the elastic limit and the rupture strength are slightly increased as compared with the values characterizing the strain-hardened steel before heat treatment at ambient temperature, and that above a certain temperature (about 400°) the elastic limit and the rupture strength decrease progressively as a function of the temperature of the heat treatment, the region of decrease of the curves being characteristic of the recovery treatment and being extended beyond a higher temperature (about 600°) by a region of less slope which corresponds to an annealing treatment causing a very substantial or total recrystallization. It was found, in accordance with the invention, that the minimum temperature at which the heat recovery treatment must be carried out on the strain-hardened wire in order to make it H₂S compatible corresponds to the temperature at which the elastic limit of the treated wire is reduced to a value not exceeding the elastic limit of the cold-hardened wire. In the case of the steel wires shown in FIG. 12, the recovery treatment must be carried out a temperature above about 430°, for which the elastic limits of the thermally treated wires correspond to values of 975 MPa for the FM 35 and 1180 MPa for the FM 56 respectively, which values characterize these wires in their strain-hardened state.

Summarizing, by the present invention one obtains wires the mechanical properties of which are between:
Re 750 and 1150 MPa
Rm 850 and 1200 MPa
HRc 22.5 and 37

The wires thus produced are characterized by their good behavior under stress corrosion in the presence of H₂S, as verified by tests carried out in accordance with NACE Standard 0177 under stresses capable of reaching 70% of the elastic limit.

The use of the approximately 0.25–0.80% steels for the manufacture of reinforcement wires by the method of the invention, which wires are to constitute reinforcement plies for flexible conduits, permits a gain in the case of the recovered strain-hardened steel of 25%, either in weight of steel or in operating pressure, as compared with the steels used up to the present time.

As a matter of fact, in order to compare, for instance, specimen No. 3 with specimen No. 6 of Table I (steel of the type at present used with a hardness of less than 22 HRc) and employing in both cases the same margin of safety of 2.25 (conventional value) between operating stress and rupture limit, the operating stresses permissible are in the same ratio as the rupture limits, which are on the order of 1000 (wire No. 3) and 800 MPa (wire No. 6) respectively, namely a ratio of 1000/800=1.25.

The corresponding values of maximum stress under the operating conditions, which are thus 1000/2.25=444 and 800/2.25=355, are actually acceptable with respect to the other two dimensioning criteria. We have:

stress in hydrostatic tests on the flexible conduit (at 1.5×operating pressure) less than the elastic limit: namely 1.5×444=666<Re=932 MPa (wire No. 3)
and 1.5×355=533<Re=690 MPa (wire No. 6)
operating stress less than the stress effected in the NACE tests without rupture.

The shaping of the wire with strain-hardening can be effected by any known process of drawing, rolling, stretching or hammering. The strain-hardening operation can be carried out in several passes; it may also be preceded by a hot shaping operation without strain-hardening, which makes it possible, for instance, to produce an intermediate preformed wire from a round machine wire. Similarly, one can use a machine wire having a non-circular cross section selected as a function of the final cross section of the wire. In all cases, the strain-hardening rate, as it is taken into consideration in accordance with the present invention, is determined on basis of the respective cross sections, on the one hand, of the wire after hot transformation and before transformation inducing a strain-hardening effect and, on the other hand, the final transformed wire.

In one particular embodiment, the recovery heat treatment can be combined with the shaping operation which comprises a final phase which is carried out on a previously heated wire, said final phase being possibly a drawing, rolling or stretching.

Interesting results are obtained by using steels killed either with silicon or aluminum or else with silico-calcium or a combination of these elements, in order to facilitate the strain-hardening and improve the quality of the final product.

When steels containing a dispersoid additive (vanadium, niobium, titanium, boron, etc.) are used and treated by the method of the invention, higher values of Re and Rm are obtained, for instance an Rm between 850 and 1400 MPa.

The flexible conduits produced at least in part with steel wires obtained in accordance with the present invention may have inside diameters varying, for instance, between 25 mm and 500 mm, the maximum operating pressures possibly reaching up to 1000 bars. The elements of flexible conduits made with the steel wires of the present invention can, in particular, be a sheathing, a vault, a carcass or a metal reinforcement.

We claim:

1. A carbon ferrite-pearlite wire which is produced by a method comprising subjecting an initial wire of carbon steel having a carbon content of between 0.25 and 0.8 and a manganese content of up to 1.4%, which is continuous, of long length and of constant cross section, to at least one shaping operation causing a strain-hardening the average percentage of which is greater than at least 5%, and heat-treating said shaped wire, wherein for a given strain-hardening percentage of the initial wire, a heat treatment is carried out under conditions of time and temperature such that the steel wire obtained after treatment has a mechanical rupture strength (Rm) greater than 850 MPa and a structure containing little free ferrite and a wire which is resistant to corrosion in the presence of H₂S.

2. A ferrite-pearlite steel wire comprising a steel the carbon content of which is between 0.25 and 0.80%, the manganese content of which is up to 1.4%, and without dispersoid, a free ferrite content of less than 15% and a mechanical rupture strength (Rm) of between 850 and 1200 MPa, said wire being resistant to corrosion in the presence of H₂S.

3. A ferrite-pearlite steel wire comprising a steel the carbon content of which is between 0.25 and 0.80%, the manganese content of which is up to 1.4% with at least one dispersoid, a free ferrite content of less than 15%, and the rupture limit (Rm) between 850 and 1400 MPa, said wire being resistant to corrosion in the presence of H₂S.

4. A flexible conduit comprising at least one reinforcement made from at least one ply of steel wires according to claim 2.

5. A flexible conduit comprising at least one reinforcement made from at least one ply of steel wires according to claim 2.

6. A wire according to claim 3 in which the dispersoid is Ti, V, B or Ni.

7. A wire according to claim 2 in which the wire is silicon-killed.

8. A wire according to claim 7 in which the wire is also aluminum-killed.

9. A wire according to claim 2 in which the wire is silicon-calcium killed.

10. A wire according to claim 3 in which the wire is silicon-killed.

11. A wire according to claim 10 in which the wire is also aluminum-killed.

12. A wire according to claim 3 in which the wire is silicon-calcium killed.

13. A wire according to claim 2 in which the magnesium content of the steel is 0.6 to 1.4% and the silicon content is 0.2 to 0.4%.

14. A wire according to claim 13 in which the ferrite concentration is less than 12%.

15. A wire according to claim 3 in which the magnesium content of the steel is 0.6 to 1.4% and the silicon content is 0.2 to 0.4%.

16. A wire according to claim 15 in which the ferrite concentration is less than 12%.

* * * * *